United States Patent
Zibella et al.

(10) Patent No.: US 6,205,606 B1
(45) Date of Patent: Mar. 27, 2001

(54) VERTICALLY STORED DOCK LEVELER

(75) Inventors: Michael A. Zibella, Hudson; Mark S. Lounsbury, Wassaic; George D. Quinlan, Valatie, all of NY (US)

(73) Assignee: Overhead Door Corporation, Dallas, TX (US)

( * ) Notice: Subject to any disclaimer, the term of this patent is extended or adjusted under 35 U.S.C. 154(b) by 0 days.

(21) Appl. No.: 09/343,989

(22) Filed: Jun. 29, 1999

(51) Int. Cl.$^7$ .................................................. E01D 1/00
(52) U.S. Cl. ............................ 14/71.3; 14/69.5; 14/71.1
(58) Field of Search .............................. 14/69.5, 71.1, 14/71.3, 71.7

(56) References Cited

U.S. PATENT DOCUMENTS

| | | |
|---|---|---|
| 809,910 * | 1/1906 | DeLay . |
| 3,296,639 * | 1/1967 | Pawlus . |
| 3,636,578 | 1/1972 | Dieter . |
| 3,645,502 * | 2/1972 | Stromp, Jr. .................... 254/29 R |
| 3,685,077 | 8/1972 | Wiener et al. . |
| 4,091,488 | 5/1978 | Atzberger . |
| 4,593,424 * | 6/1986 | Beck ..................... 14/71.7 |
| 4,689,846 | 9/1987 | Sherrod . |
| 4,776,052 | 10/1988 | Delgado et al. . |
| 4,825,493 | 5/1989 | Nguyen . |
| 4,935,979 | 6/1990 | Walker et al. . |
| 5,001,799 | 3/1991 | Alexander et al. . |
| 5,117,526 | 6/1992 | Alexander . |
| 5,195,205 | 3/1993 | Cook . |
| 5,214,818 | 6/1993 | Cook . |
| 5,274,867 | 1/1994 | Hageman . |
| 5,313,681 | 5/1994 | Alexander . |
| 5,343,583 | 9/1994 | Cook . |
| 5,396,676 | 3/1995 | Alexander et al. . |
| 5,546,623 * | 8/1996 | Hahn ........................... 14/69.5 |
| 5,586,355 * | 12/1996 | Metz et al. .................. 14/69.5 |
| 5,621,938 | 4/1997 | Warner . |
| 6,009,587 * | 1/2000 | Beeman ...................... 14/69.5 |

\* cited by examiner

*Primary Examiner*—Eileen D. Lillis
*Assistant Examiner*—Gary S. Hartmann
(74) *Attorney, Agent, or Firm*—Akin, Gump, Strauss, Hauer & Feld, L.L.P.

(57) ABSTRACT

A vertically storable dock leveler apparatus includes a generally planar ramp member mounted on a frame by a hinge connection which includes spaced apart hinge plates secured to the frame, each having hinge pin receiving bores formed therein. An elongated cylindrical hinge pin is secured to the ramp and extends through the receiving bores of the hinge plates. The ramp is provided with elongated clearance slots formed therein providing clearance for the hinge plates when the ramp is assembled to the frame. Linearly extensible gas springs are interconnected between the ramp and the frame for biasing the ramp toward a vertically oriented stored position. An elongated actuating member is adapted to be releasably connected to a member mounted on one lateral edge of the ramp and also disposed in a socket member mounted on the frame for use in moving the ramp between working and stored positions and for retaining the ramp in its stored position, respectively. The ramp and actuating member may be secured together with a padlock to lock the ramp in the stored position.

19 Claims, 4 Drawing Sheets

VERTICALLY STORED DOCK LEVELER

FIELD OF THE INVENTION

The present invention pertains to a manually actuated vertically stored dock leveler apparatus.

BACKGROUND

In the art of dock levelers or so-called dockboards, there have been substantial developments over a long period of time to provide dock levelers with relatively complex mechanisms for moving the dock leveler between a stored position and a working position. Still further, substantial developments have been carried out to provide dock levelers with relatively complex mechanisms for moving retractable ramp extension or so-called lip sections between working and stored positions also.

However, there are many applications for dockboards or dock levelers which require relatively uncomplicated structures which should be capable of being conveniently actuated to move between working and stored positions, which may be maintained in a stored position in a substantially vertical or upright position of the leveler ramp member and which may be locked in the stored position. The present invention has been developed with a view to providing a dock leveler apparatus which is inexpensive, easily manipulated for moving the ramp section between stored and working positions and may be securely stored in a generally vertical position of the ramp member.

SUMMARY OF THE INVENTION

The present invention provides an improved dock leveler or dockboard for use in providing a ramp extending between a loading dock and a vehicle parked thereat.

In accordance with one important aspect of the present invention, a dock leveler is provided which includes a ramp section which is adapted to be stored in an upright or vertical position and movable between stored and working positions by a manual actuating member. In accordance with another aspect of the invention, a vertically storable dock leveler is provided wherein an actuating member is movable from a position for moving the dock leveler ramp between working and stored positions and a position wherein the actuating member is operable to maintain the ramp in its elevated or stored position and locked in the stored position, if desired. The actuating member or lever is also operable to provide additional indication that the leveler ramp is disposed in its stored position and is substantially secured in that position.

In accordance with a further aspect of the present invention, a vertically storable dock leveler is provided with counterbalance or biasing mechanisms comprising spaced apart cylinder and piston type "gas springs" for providing a counterbalance effort to assist in moving the leveler ramp between working and stored positions.

In accordance with yet a further aspect of the invention a vertically storable dock leveler is provided which includes an improved hinge structure for connecting a pivotable ramp member to a leveler base or frame member. Still further, the ramp member is provided with opposed side edge curbs or guards to minimize the risk of side edge runoff from the ramp.

Those skilled in the art will appreciate that the vertically storable dock leveler apparatus of the present invention is easy to fabricate, easy to operate and reliable in operation. Those skilled in the art will further appreciate the above-mentioned advantages and superior features of the dock leveler apparatus of the present invention upon reading the detailed description which follows in conjunction with the drawing.

DETAILED DESCRIPTION OF A PREFERRED EMBODIMENT

Figure 1:
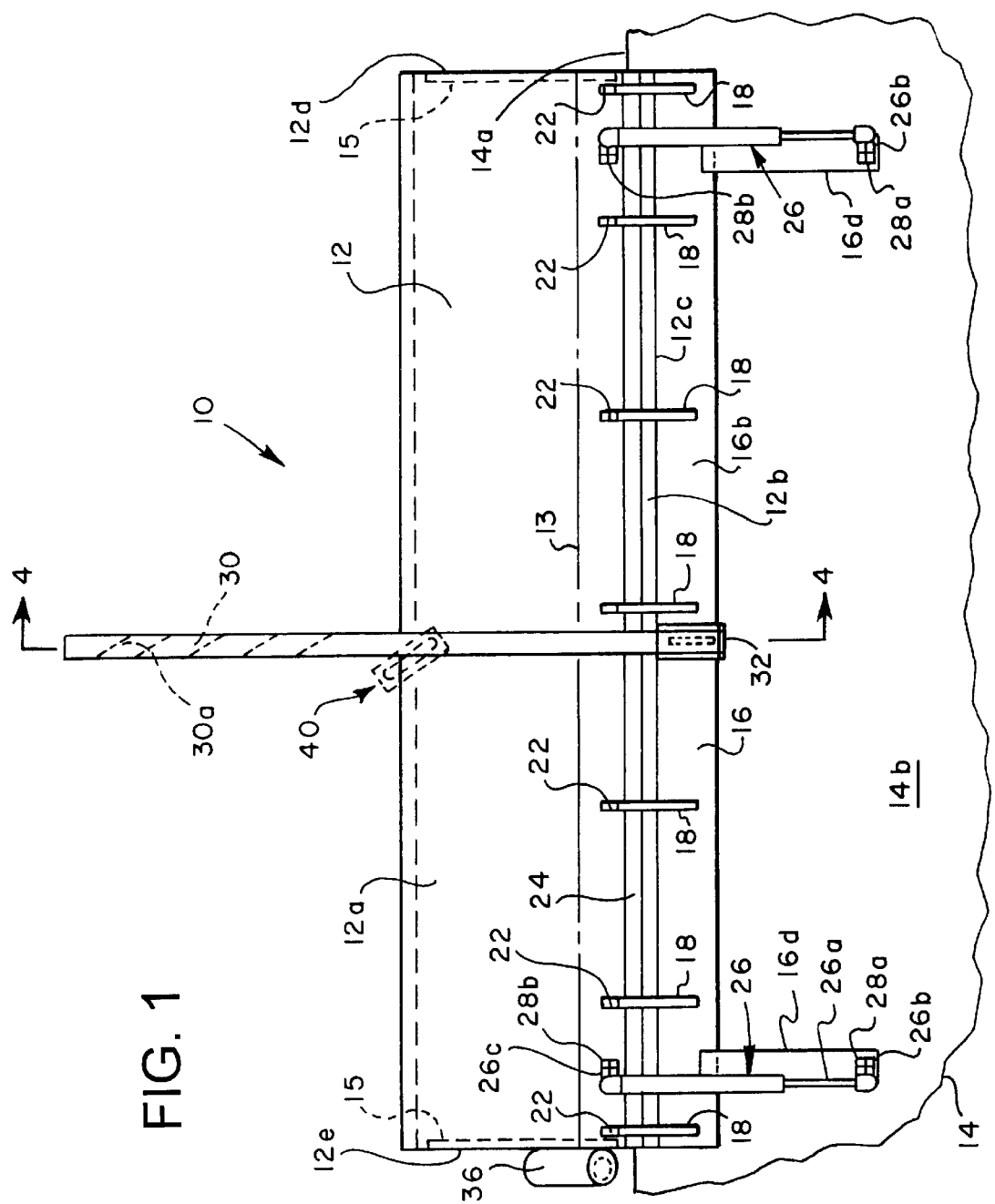
FIG. 1 is a front elevation of a dock leveler in accordance with the invention shown in the vertical, stored position.

In the description which follows, like parts are marked throughout the specification and drawing with the same reference numerals, respectively. The drawing figures are not necessarily to scale and certain elements may be shown in somewhat generalized form in the interest of clarity and conciseness.

Figure 2:
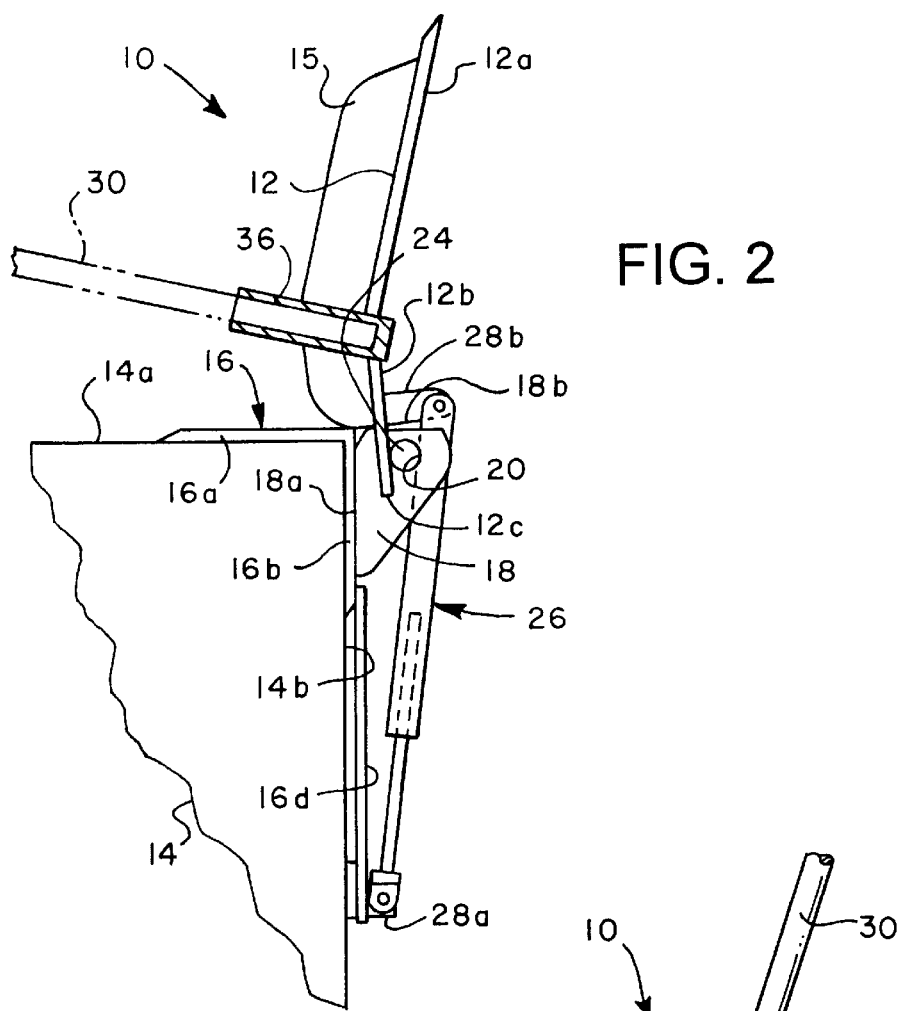
FIG. 2 is a left side elevation of the dock leveler shown in FIG. 1 in the stored position.
Figure 3:
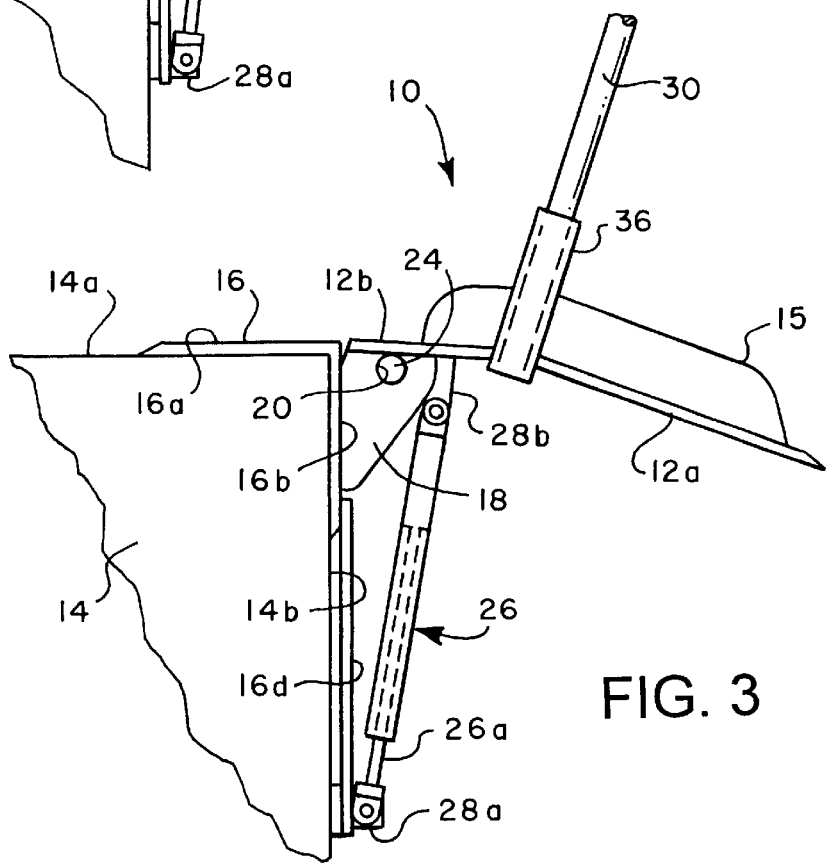
FIG. 3 is a left side elevation of the dock leveler shown in FIG. 1 in a fully declined, working position.

Referring to FIGS. 1 and 2, in particular, there is illustrated a vertically stored manually actuatable dock leveler apparatus in accordance with the invention and generally designated by the numeral 10. The dock leveler apparatus 10 is characterized by a generally planar ramp section 12 comprising a substantially rectangular metal plate which may be bent or fabricated in two parts and joined along a line 13 to form a first section 12a and a second section 12b. The ramp sections 12a and 12b form a slight angle relative to each other to facilitate vehicle loading and unloading operations when the ramp 12 is in a working position. The dock leveler apparatus 10 is adapted to be mounted at a loading dock facility, including a dock structure 14 having a generally horizontal transport surface 14a and a generally horizontal front wall 14b at which a vehicle, not shown, may approach to a parking position and whereby the ramp 12 may be moved from its vertically stored position shown in FIGS. 1 and 2 to a declined working position as shown in FIG. 3. Elongated upstanding ramp curb plates 15 are secured to the ramp 12 along opposed sides 12d and 12e.

The dock leveler apparatus 10 includes a frame comprising an elongated angle-shaped frame member 16 which is suitably mountable on the dock 14 in the manner illustrated in the drawing. The angle frame member 16 includes a generally horizontal flange part 16a integrally formed with a vertically depending flange part 16b. Referring further to FIGS. 1 and 2, the frame 16 includes a plurality of spaced apart somewhat triangular shaped hinge plate members 18 which are suitably secured to the frame 16 at the flange 16b, spaced apart and aligned with each other at hinge pin receiving bores 20, see FIG. 2. The hinge plate members 18 are preferably secured to the frame member 16 by welding each of the plate members 18 along a surface or edge 18a, FIG. 2, respectively, to the flange 16b with the bores 20 aligned with each other. A top edge 18b, FIG. 2, of each hinge plate 18 is substantially coplanar with the dock surface 14a and frame flange 16a, as illustrated. As shown in FIG. 1, the ramp section 12b is provided with a plurality of spaced apart, elongated, parallel slots 22 corresponding in number and spacing to the hinge plates 18. The slots 22 each open to rear edge 12c of the ramp 12.

An elongated generally cylindrical hinge pin 24 extends substantially parallel to the edge 12c and is suitably secured to the ramp section 12b, such as by welding along contiguous surfaces of the ramp section and the hinge pin. The hinge pin 24 extends through the respective bores 20 of the hinge plates 18 to provide a hinge connection between the ramp 12 and the frame 16. The hinge pin 24 is secured to the ramp 12 at the contiguous surfaces of the hinge pin and the ramp section 12b, preferably by welding along the entire length of the hinge pin 24 or at suitably spaced apart points thereal ong. Welding the hinge pin 24 directly to the ramp 12 also imparts additional stiffness to the ramp.

Figure 4:
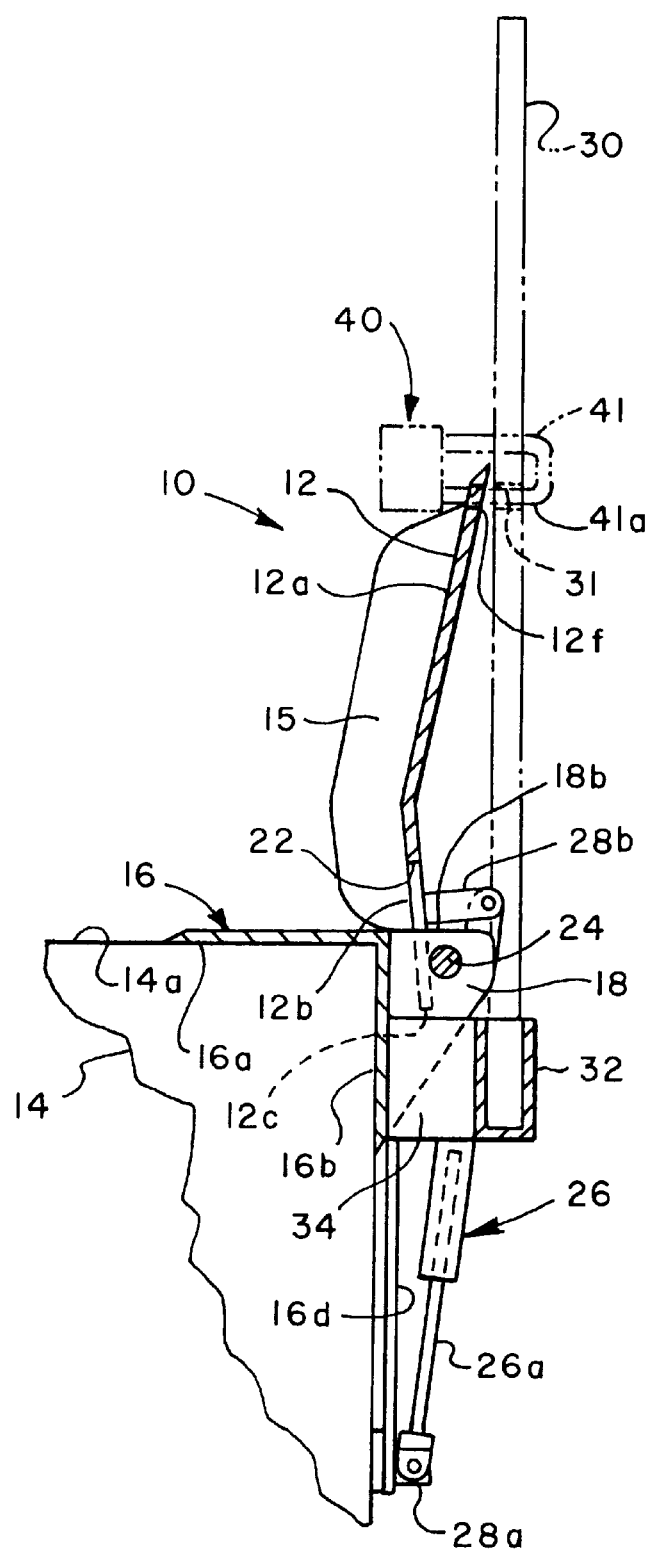
FIG. 4 is a section view taken generally along the line 4—4 of FIG. 1.

Referring further to FIGS. 1 and 2, the ramp 12 is biased to its upward, stored position by suitable counterbalance mechanism comprising spaced apart linearly extensible gas spring devices 26, each including an extensible piston rod 26a having a distal end provided with a laterally extending pivot pin 26b suitably secured to a pin receiving boss 28a mounted on a depending leg 16d of frame 16, as shown in FIG. 1, in particular. The opposite end of each gas spring device 26 includes a laterally extending pivot pin 26c suitably pivotably secured to a lug member 28b extending from the underside of the ramp section 12b, as illustrated. The piston and cylinder gas spring devices 26 may be of a type commercially available, such as a model SPD-GS-2300-100 manufactured by Service Plus Distributors of Bensalen, Pa. The gas spring devices 26 are secured to the ramp 12 in a position thereof, such as to bias the ramp to rotate in a counterclockwise direction, viewing FIGS. 2, 3 or 4, between a declined, working position, as shown in FIG. 3, to an upstanding or vertically stored position of the ramp as shown in FIGS. 1, 2 and 4.

The forces exerted by the gas spring devices 26 are not sufficient to overcome the weight of the ramp 12 when it moves about its pivot or hinge pin 24 substantially toward its working position and thus assistance is required to move the ramp 12 from a generally horizontal working position to its generally vertical stored position. Once the ramp 12 moves to a position of about thirty degrees from the vertical, it is essentially in balance with the counterbalance effort of the gas springs 26 so that the ramp will "float" with any vertical movement of a vehicle load floor on which the ramp section 12a is resting. However, the gas springs devices 26 are sized such that minimal manual effort is required to move the ramp 12 from a working position, as shown in FIG. 3 for example, to its stored position.

The dock leveler apparatus 10 is provided with a combination ramp retaining and actuating lever member comprising an elongated generally cylindrical rod 30. As shown in FIGS. 1 and 4, the rod 30 may be stored in a receiver member 32 comprising a generally cylindrical tubular socket, see FIG. 4, which is suitably mounted on the frame flange 16b by a connecting web member 34. As also shown in FIGS. 1 and 4, the receiver member 32 is operable to receive one end of the rod 30 in an upstanding position thereof to engage and retain the ramp 12 in the substantially vertically extending stored position shown. Moreover, the actuating and retaining rod 30 may be provided with suitable high visual contrast indicia 30a thereon to increase visibility of the rod under all circumstances, including when it is retaining the ramp 12 in the position shown in FIGS. 1 and 4.

The actuating and retaining rod member 30 is removable from the receiver 32 and insertable in a receiver member 36, FIGS. 1, 2 and 3, also comprising a generally cylindrical tubular socket suitably secured, such as by welding, to a lateral side edge 12e of the ramp 12 and projecting substantially normal to the plane of ramp section 12a, as shown. The rod member 30 may be inserted in the receiver number 36 for moving the ramp 12 between its stored position shown in FIGS. 1, 2 and 4 toward its working position shown in FIG. 3 and to return the ramp to the stored position. In particular, the actuating rod 30 is useful when inserted in the receiver 36 to assist in moving the ramp from its working position shown in FIG. 3 toward its stored position as shown in FIGS. 1, 2 and 4. Of course, when the ramp 12 is moved to the stored position, the rod 30 may be removed from receiver 36 and placed in the receiver 32 for the purpose described hereinbefore.

Referring further to FIGS. 1 and 4, another important feature of the dock leveler apparatus 10 resides in the provision of means for locking the ramp 12 in the upright stored position shown. In this regard, a padlock 40 may be provided and arranged such that its shackle 41 may have one leg 41a pass through a transverse bore 31, FIG. 4, in the actuating lever rod 30 and also through a suitable bore 12f formed in the ramp 12 and positioned such that it is aligned with the bore 31 when the actuating lever rod is disposed in the receiver 32. In this way, the ramp 12 may be securely locked in the stored position shown in FIG. 1 when the actuating and retaining rod member 30 is placed in the receiver 32 and locked to the ramp 12 as shown.

Figure 5:
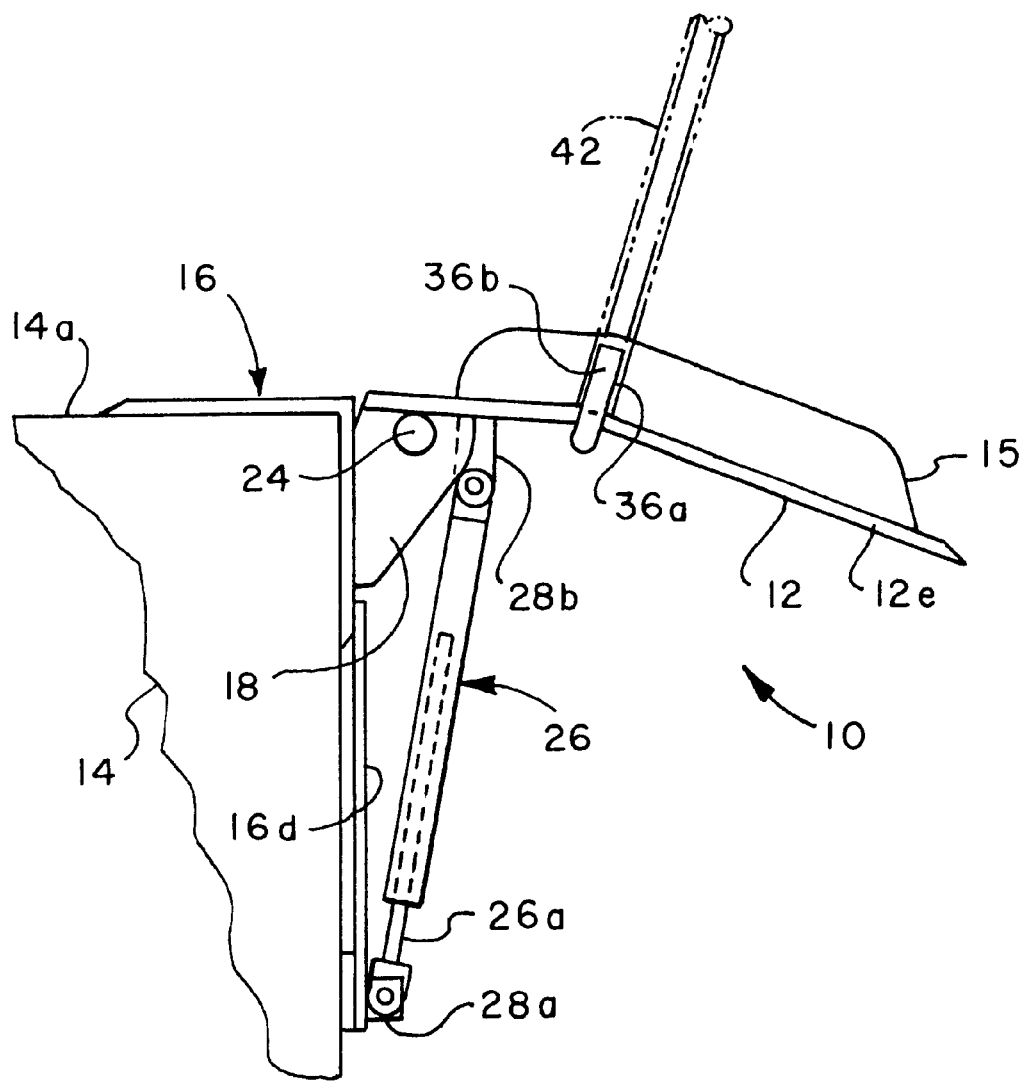
FIG. 5 is a view similar to FIG. 3 showing an alternate embodiment of an actuating lever and its connection to the ramp member.

Referring briefly to FIG. 5, a modification of the actuating and retaining member is illustrated and designated by the numeral 42 and comprises an elongated cylindrical tubular member which is connectable to the ramp 12 at an L-shaped cylindrical cross section rod-like receiver member 36a which is suitably welded to the side edge 12e of ramp 12 in place of the tubular socket-like receiver member 36. Leg 36b of the receiver member 36a is adapted to fit snugly within one end of the tubular actuating and retaining member 42 to provide for operation in the same manner as described above.

The operation of the dock leveler apparatus 10 is believed to be readily understandable to those skilled in the art from the foregoing description. Conventional engineering materials may be used to fabricate the parts of the apparatus 10 and fabrication may be carried out using conventional engineering and fabrication practices for dock levelers and similar apparatus. Moreover, the configuration of the hinge connection between the frame 16 and the ramp 12 is also an advantageous low cost arrangement.

Although preferred embodiments of the invention have been described in detail herein, those skilled in the art will recognize that various substitutions and modifications may be made to the dock leveler apparatus described and shown without departing from the scope and spirit of the appended claims.

What is claimed is:

1. A vertically storable dock leveler apparatus comprising:
   a frame adapted to be mounted on a loading dock;
   a ramp mounted for pivotal movement on said frame between a substantially horizontal working position and a substantially vertically extending stored position;
   spring means operably connected to said ramp for biasing said ramp toward said stored position;
   an actuating member for moving said ramp with respect to said frame;
   a receiver member secured to said ramp for receiving said actuating member; and
   a receiver member mounted on said frame for receiving said actuating member in a stored position of said ramp for retaining said ramp in said stored position.

2. The apparatus set forth in claim 1 wherein:

said receiver member comprises a tubular socket member mounted on said ramp.

3. The apparatus set forth in claim 1 wherein:

said receiver member comprises a rod-like projection connected to said ramp and said actuating member comprises a tubular part adapted to be sleeved over said rod-like projection of said receiver member.

4. The apparatus set forth in claim 1 including:

a hinge for connecting said ramp to said frame comprising a plurality of hinge plates secured to said frame at spaced apart points thereon, said hinge plates including hinge pin receiving bores formed therein, and a hinge pin secured directly to said ramp and extendable through said bores in said hinge plates to form a pivot connection between said ramp and said frame.

5. The apparatus set forth in claim 1 including:

lock means operable to engage said ramp and said actuating member when said actuating member is received in said receiver member mounted on said frame for locking said ramp in said stored position.

6. The apparatus set forth in claim 1 including:

opposed side edge curbs on said ramp extending along opposed lateral side edges, respectively.

7. The apparatus set forth in claim 1 wherein:

said spring means comprises at least one linearly extensible gas spring connected to said ramp and said frame.

8. The apparatus set forth in claim 7 wherein:

said spring means comprises two spaced apart linearly extensible gas springs interconnecting said ramp and said frame, respectively.

9. A vertically storable dock leveler apparatus comprising:

a frame adapted to be mounted at a loading dock;

a ramp mounted for pivotal movement on said frame between a substantially horizontal working position and a substantially vertically extending stored position;

an actuating member for moving said ramp with respect to said frame;

a receiver member secured to said ramp for receiving said actuating member in a first position of said actuating member with respect to said frame for moving said ramp with respect to said frame; and said actuating member being operable to be removed from said receiving member and moved to a second position in engagement with said ramp and said frame in a stored position of said ramp for retaining said ramp in said stored position.

10. The apparatus set forth in claim 9 including:

lock means operable to engage said ramp with said actuating member when said actuating member is in said second position for locking said ramp in said stored position.

11. A vertically storable dock leveler apparatus comprising:

a frame adapted to be mounted on a loading dock;

a ramp mounted for pivotal movement on said frame between a substantially horizontal working position and a substantially vertically extending stored position;

gas spring means operably connected to said ramp and said frame for biasing said ramp toward said stored position;

an actuating member for moving said ramp with respect to said frame;

a first receiver member secured to said ramp for releasably receiving said actuating member; and a second receiver member mounted on said frame for releasably receiving said actuating member in a stored position of said ramp for retaining said ramp in said stored position.

12. The apparatus set forth in claim 11 wherein:

said receiver members comprise tubular socket members mounted on said ramp and on said frame, respectively.

13. The apparatus set forth in claim 11 wherein:

at least one of said receiver members comprises a rod part and said actuating member comprises a tubular part adapted to be engaged with said rod part of said one receiver member in sleeved relationship thereover.

14. The apparatus set forth in claim 11 including:

lock means operable to be connected to said actuating member and said ramp for locking said ramp in said stored position when said actuating member is connected to said second receiver member.

15. A vertically storable dock leveler apparatus comprising:

a frame adapted to be mounted on a loading dock;

a ramp mounted for pivotal movement on said frame between a substantially horizontal working position and a substantially vertically extending stored position;

spring means operably connected to said ramp and said frame for biasing said ramp toward said stored position;

an actuating member for moving said ramp with respect to said frame between said working and stored positions;

a hinge for connecting said ramp to said frame comprising a plurality of hinge plates secured to said frame at spaced apart points thereon, said hinge plates including hinge pin receiving bores formed therein, and a hinge pin secured to said ramp and extendable through said bores in said hinge plates to form a pivot connection between said ramp and said frame; and said ramp includes a section having a plurality of spaced apart elongated slots formed therein for receiving at least portions of respective ones of said hinge plates to provide clearance between said ramp and said hinge plates when said ramp is moved between its working and stored positions, respectively.

16. The apparatus set forth in claim 15 wherein:

said frame comprises an elongated angle member including opposed generally planar flanges adapted to engage opposed surfaces of said loading dock, said hinge plates being secured to one of said flanges at spaced apart points thereon, respectively.

17. The apparatus set forth in claim 15 wherein:

said spring means comprises at least one linearly extensible gas spring connected to said ramp and said frame.

18. The apparatus set forth in claim 17 wherein:

said spring means comprises two spaced apart linearly extensible gas springs interconnecting said ramp and said frame, respectively.

19. A vertically storable dock leveler apparatus comprising:

a frame adapted to be mounted on a loading dock;

a ramp mounted for pivotal movement on said frame between a substantially horizontal working position and a substantially vertically extending stored position;

spring means operably connected to said ramp for biasing said ramp toward said stored position;

an actuating member for moving said ramp with respect to said frame;

receiver member secured to said ramp for receiving said actuating member;

a hinge for connecting said ramp to said frame comprising a plurality of hinge plates secured to said frame at spaced apart points thereon, said hinge plates including hinge pin receiving bores formed therein, and a hinge pin secured directly to said ramp and extendable through said bores in said hinge plates to form a pivot connection between said ramp and said frame; and said ramp includes a section having a plurality of spaced apart elongated slots formed therein for receiving at least portions of respective ones of said hinge plates to provide clearance between said ramp and said hinge plates when said ramp is moved between its working and stored positions, respectively.

* * * * *